H. R. HEYL & H. BREHMER.
BOOK SEWING-MACHINES.

No. 191,426.                              Patented May 29, 1877.

4 Sheets—Sheet 2.

H. R. HEYL & H. BREHMER.
BOOK SEWING-MACHINES.

No. 191,426. Patented May 29, 1877.

Witnesses:
Geo. H. Graham.
John L. Kluber.

Inventors:
Henry R. Heyl and
Hugo Brehmer
by Munson & Philipp
Attorneys.

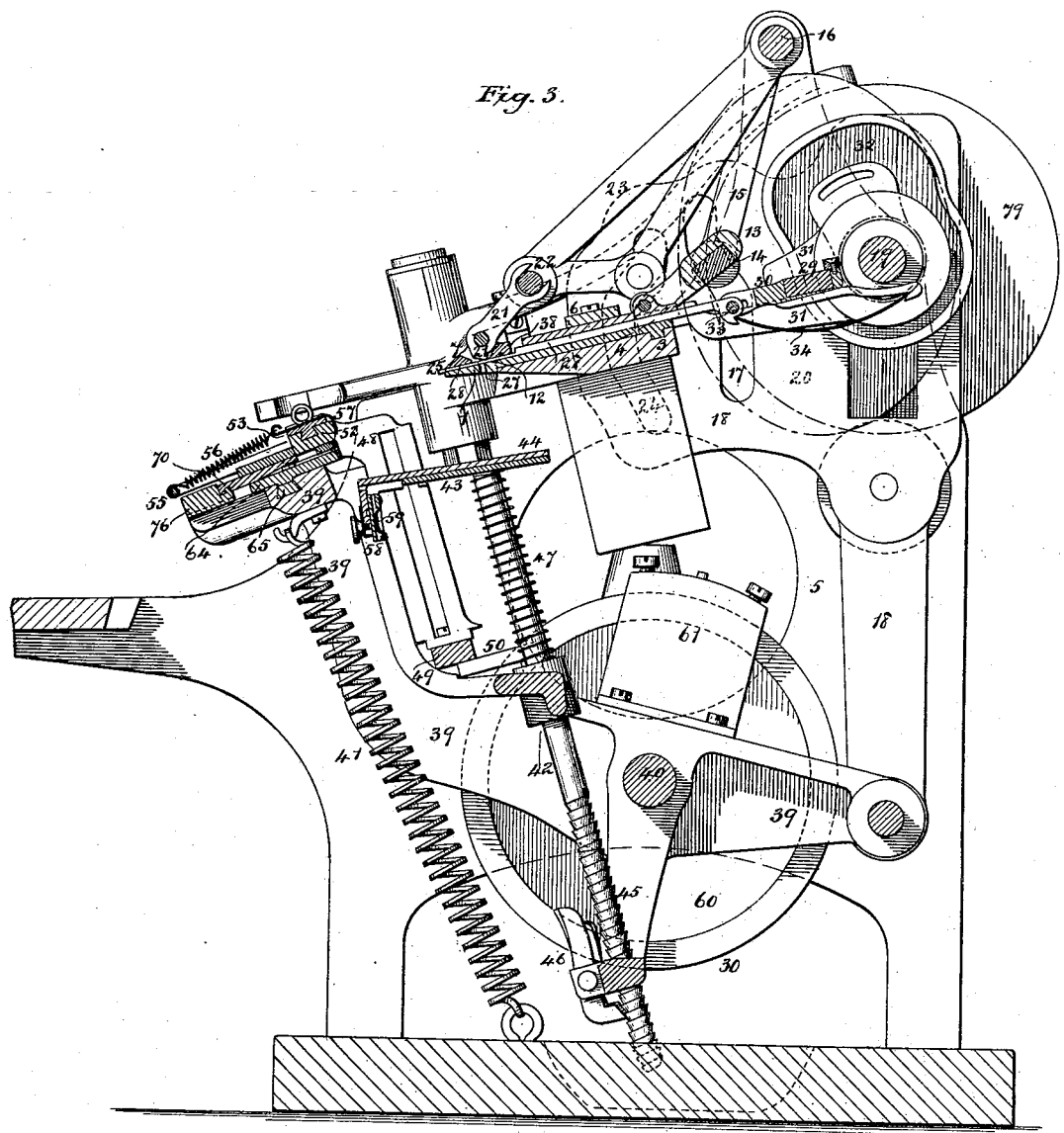

H. R. HEYL & H. BREHMER.
BOOK SEWING-MACHINES.
No. 191,426.   Patented May 29, 1877.
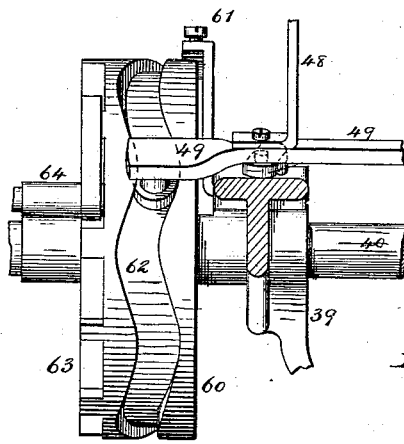
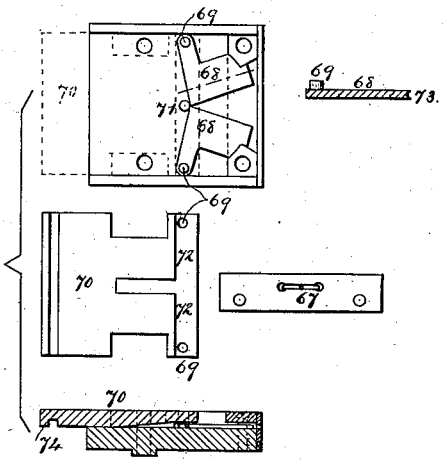
Fig. 5.
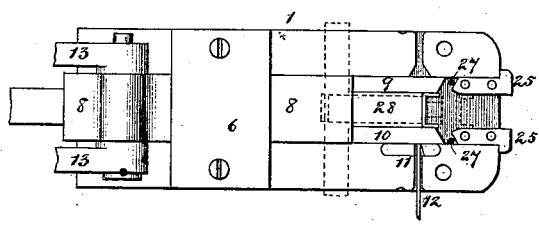
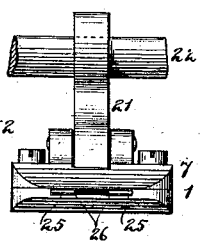
Fig. 7.   Fig. 6.
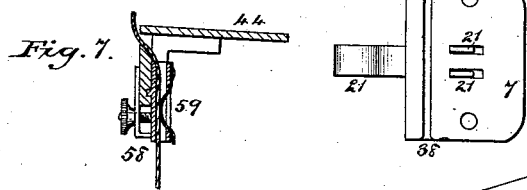
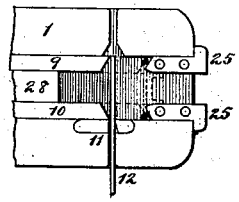
Fig. 8.
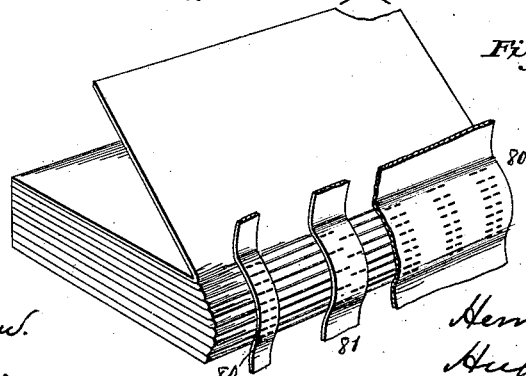
Witnesses:
Geo. H. Graham.
John L. Kluber.
Inventors:
Henry R. Heyl and
Hugo Brehmer
by Munn & Philipp
Attorneys.

UNITED STATES PATENT OFFICE.

HENRY R. HEYL AND HUGO BREHMER, OF PHILADELPHIA, PENNSYLVANIA, ASSIGNORS TO THE NOVELTY PAPER BOX COMPANY, OF SAME PLACE.

IMPROVEMENT IN BOOK-SEWING MACHINES.

Specification forming part of Letters Patent No. 191,426, dated May 29, 1877; application filed January 11, 1877.

*To all whom it may concern:*

Be it known that we, HENRY R. HEYL and HUGO BREHMER, both of the city and county of Philadelphia and State of Pennsylvania, have jointly invented certain new and useful Improvements in Machines for Stitching and Sewing Books with Wire Staples; and we do hereby declare the following to be a full, clear, and exact description of the same, reference being had to the accompanying drawings, forming a part of this specification.

The object of our invention is to produce a machine to insert wire staples, either singly or several simultaneously, in the fold of book-signatures while partially or wholly open, and clinch the same, and, when several signatures are to be united to form one book, to insert the staples, either singly or several simultaneously, through the fold of the signature when partially or wholly open, and also through tapes or bands at the back of the signature, so that when several of such signatures are successively secured to said tapes or bands they shall be bound together by a strong and flexible binding, such as is embodied in the United States Letters Patent granted to Henry R. Heyl, August 8, 1876, No. 180,765.

The invention consists in the devices and their combinations, hereinafter fully described and claimed.

Figure 1:
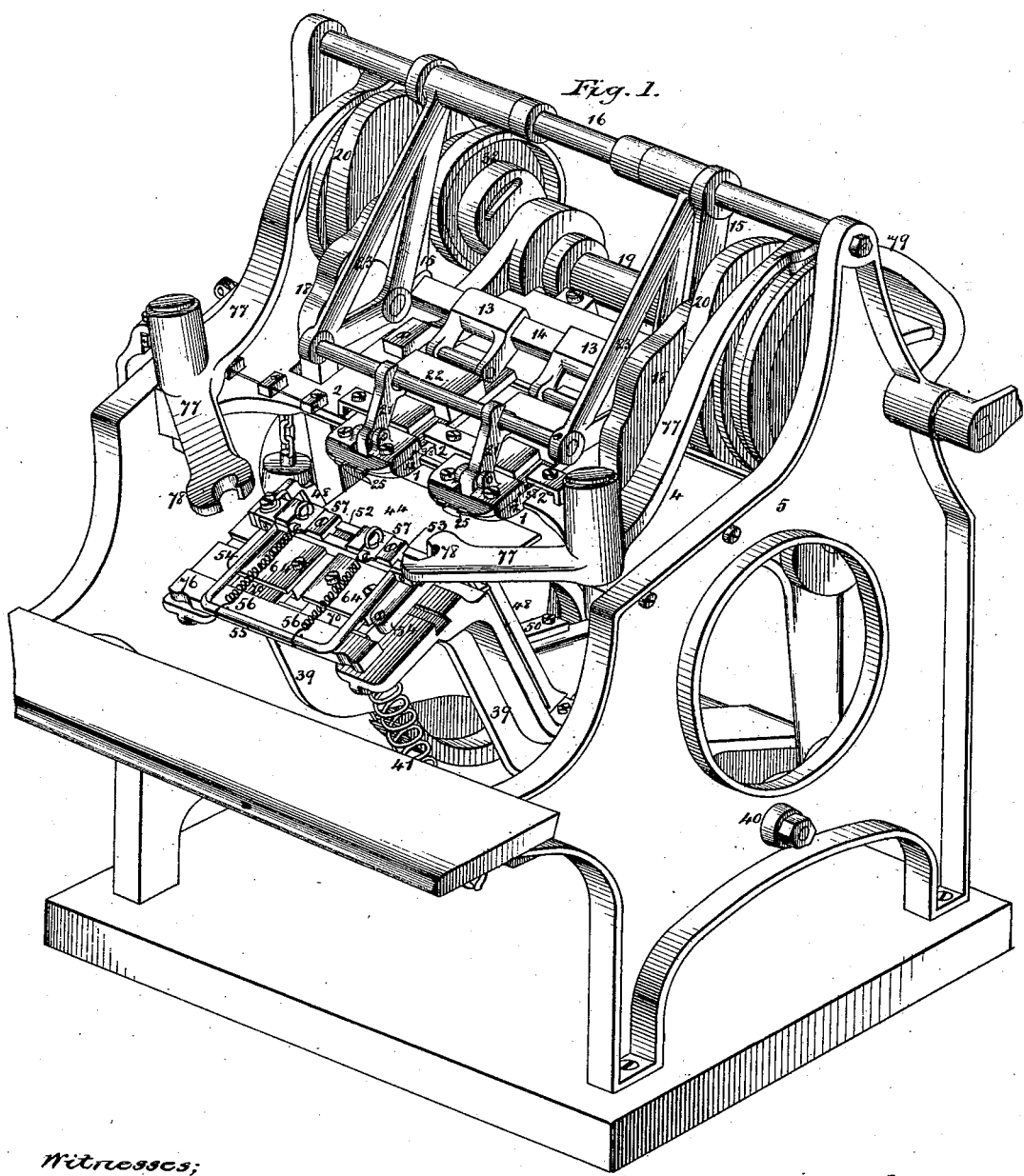
Figure 2:
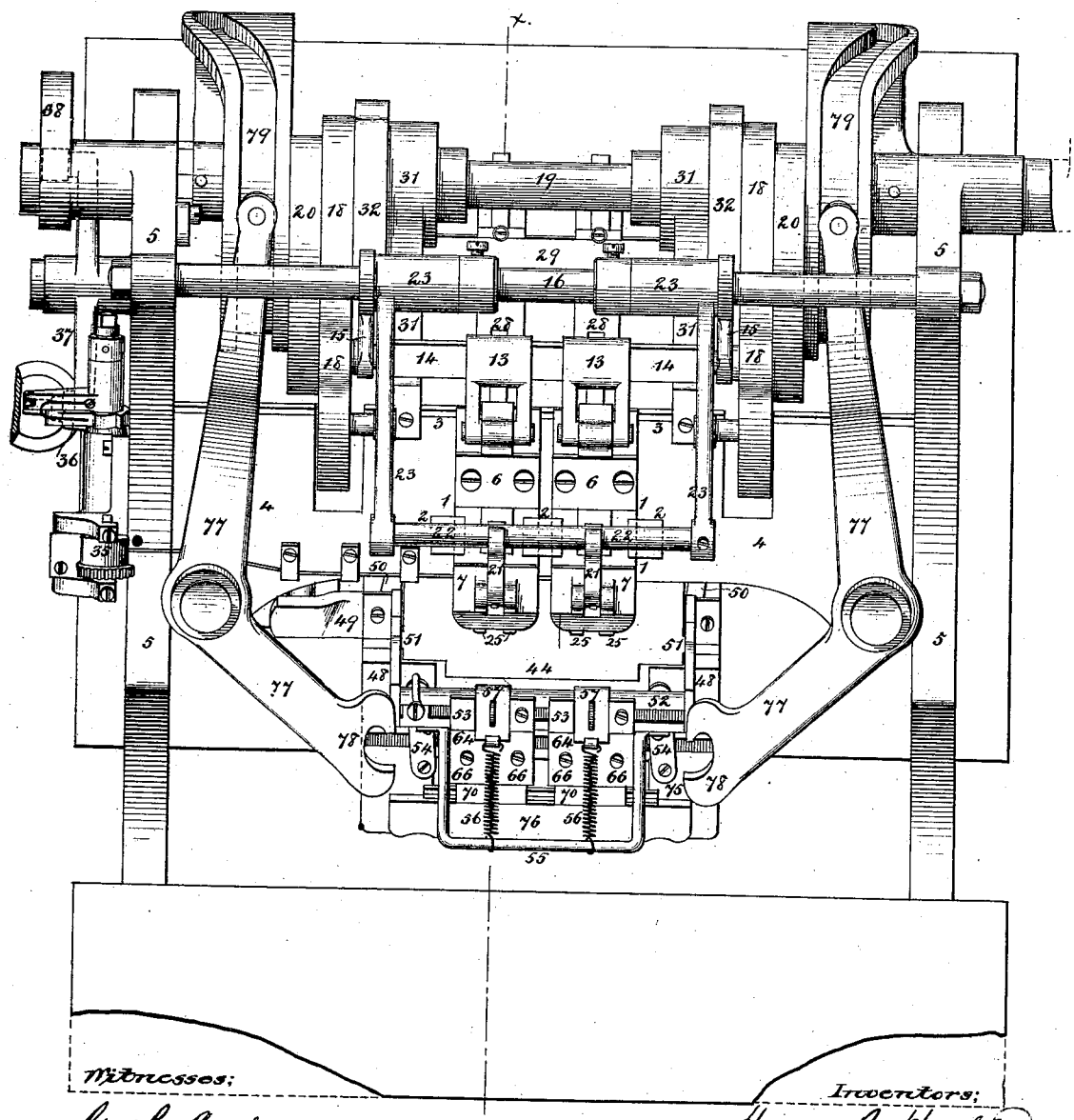

In the drawings, Figure 1 is a perspective view of a machine embodying our invention. Fig. 2 is a plan view of the same. Fig. 3 is a vertical section through the line X X of Fig. 2. Figs. 4, 5, 6, and 7 are detail views of various important parts of the machine; and Fig. 8 is a view of a book illustrating some of the kinds of work done by this machine.

This machine, embodying our invention, differs from the prior machines embodied in United States Letters Patent granted to Henry R. Heyl and August Brehmer, October 8, 1872, No. 132,078, assigned to American Paper Box Machine Company, and those granted to Henry R. Heyl, assigned to the Novelty Paper Box Company, March 28, 1876, No. 175,457, and October 24, 1876, No. 183,670, in the following general features:

It is adapted to insert staples, singly or several simultaneously, through the fold of a book-signature partially or wholly open from the inside, and to continue the operation on successive signatures without requiring that any of them shall be removed until the required number shall have been stapled.

It is adapted to hold one or more binding tapes or bands between the back edges of the signatures and the clinching mechanism, so that the staples may be clinched upon the tapes or bands, and thus secure the signatures firmly thereto.

The table upon which the signatures are supported is capable of being moved downward, at or nearly at right angles, to the plane of operation of the staple-inserting devices, so that as the signatures of the book are multiplied, each freshly-added signature will occupy the place of its predecessor during the stapling operation, and thus the signatures are gradually lowered until the last signature is stapled.

The completed book or number of signatures may then be removed and the table raised to the proper height to rightly hold the first of another series of signatures.

Staple forming and inserting: 1 is a head-block, secured by clamps 2 and matching 3 to the support 4 of the frame 5 of the machine, and capable of longitudinal adjustment.

This head-block is provided with a groove, partially covered by removable plates 6 7.

Within this groove is a bending-fork, 8, the prongs 9 10 of which are made beveling, as shown in the drawing at Fig. 6, to bend the wire from its ends around a swinging mandrel, and to enable one prong, 10, to operate, in connection with a die, 11, at the end of the wire-feeding channel 12 in the head-block, as a cutter to sever the wire.

These prongs 9 10 are provided with channels on their inner surfaces to receive the staple as it is formed.

This bending-fork is connected at its rear end to a bar, 14, by a link, 13, adjustable longitudinally on said bar.

The bar 14 is attached to two arms, 15, pivoted to a shaft, 16, secured to the frame 5 of the machine, and is vibrated by two similar cams, 17, on plates 18, that straddle the main shaft 19, and receive motion through cams 20 on said main shaft, that impart a perfectly uniform motion to it.

21 is a swinging mandrel, pivoted to the plate 7, its rear end being slotted, and fitting loosely over a shaft, 22, secured to arms 23, pivoted to the shaft 16.

These arms 23 are vibrated, to impart motion to the swinging mandrel 21, by two similar cams, 24, on plates 18, that impart a perfectly uniform motion to the shaft 22.

The front end of the mandrel 21 is bifurcated, and the bifurcations project through two slots in the plate 7.

The reason we prefer to use these slots and bifurcations is, that if the mandrel were in one piece and projected through one slot, when the wire is being fed it would have a tendency to enter the slot, and thus, possibly, cause trouble, while in this construction it is met by a plane surface, which obviates this difficulty.

25 are plates, preferably removably secured by the dowel-pins and holes to the head-block 1.

These are provided with channels 26 on their inner sides, which serve to guide the staple and present it for insertion.

Holes 27 are made through the bottom of the head-block 1, extending from the recess, to allow any small particles of wire, &c., to fall out, and thus prevent the space between the ends of the prongs 9 10 of the bending-fork and the plates 25 from being clogged.

28 is a staple driver, reciprocated within the bending-fork 8 by a bar, 29, to which it is connected through a slide, 30, adjustable to fixed positions thereon, said bar moving in bearings 31, and receiving a perfectly uniform motion through two similar cams, 32, on the main shaft 19.

The driver 28 is connected to the slide 30 by means of a pin, 33, fitting into elongated bearings in said slide, against the outer surface of which the pin is forced by means of a spring, 34, having its bearings in projections upon the slide and on the driver.

This construction provides against a too rigid pressure of the staple-driver on the crown of the staple, and allows it to accommodate itself to the varying thicknesses of the paper to be stapled, the spring 34 being made stiff enough to overcome the resistance of the staple as it pierces the paper, and yet not so stiff as to embed the staple-crown too deeply into the paper.

The front of the head-block 1, the plate 7, and support 4 are cut away at an angle, as shown, so as to enter the fold of the signature and come close to the paper while the staple is being driven, and the plates 25 may project slightly beyond the front of the head-block, to more effectually accomplish this result.

It will be seen that the bending-fork 8, with its prongs 9 10, does not move forward against the paper to be stapled, and act as a guide and support for the staple while it is being inserted, as is the case in the machines hereinbefore referred to as patented, but that a continuation of the staple-channels from the ends of the prongs 9 10 of the bending-fork to the point where the staple enters the paper is formed by means of the channels 26 of the plates 25.

We are thereby enabled to form our staples farther back and away from the point of insertion, and to materially shorten the reciprocating motion of the bending-fork, and to make the ends of the latter of the desirable form described.

These are important objects, especially in machines for inserting staples in the fold of signatures only partially opened.

It is desirable to have two or more head-blocks, 1, each provided with a bending-fork, 8, swinging mandrel 21, plates 25, with channels 26, staple-driver 28, and connections described, so as to simultaneously insert all the staples required for each signature, all being operated by bars 14 29, shaft 22, and cams 17 20 24 32, which are common to each set of devices.

Each head-block, with its set of staple forming and inserting devices and connections, is capable of adjustment to and from the other, as the size of the book may determine and by the means described.

In the drawings we have only shown two head-blocks to illustrate our invention; but any necessary number may be arranged side by side.

When several are employed, instead of using several wire-feeding rollers, one for each head-block, we prefer to use but one pair of feed-rolls, 35, by which all the wires are fed simultaneously and uniformly.

These feed-rolls are intermittingly rotated by means of a pawl, 36, receiving motion through a weighted lever, 37, from a cam, 88, on the main shaft 19 of the machine, acting upon a ratchet-wheel secured to the shaft of one roller, which is geared to the other.

Each head-block is provided with an additional wire-channel, 38, which leads the wires to the next head-block, it forming a free passage over the bending-fork and hammer for several wires.

Signature and tape holding and presenting: 39 is a bracket, journaled on a shaft, 40, secured to the frame 5 of the machine, and vibrated by similar cams 20 through plates 18, straddling the main shaft 19, having rollers bearing upon the cams, and kept in contact with the latter by a spring, 41.

In this bracket a standard, 42, has bearings, supporting a plate, 43, upon which a table, 44, holding the signatures to be stapled, loosely rests.

The lower portion of this standard has a ratchet, 45, upon it, into which pawls 46, two or more in number, catch, preventing the plate and table from being raised by the pressure of a spring, 47, as it is lowered to give room for a fresh signature after the one to be operated upon has been stapled.

The table 44 is provided with lugs upon its under side, fitting into slots in the plate 43, which permit its longitudinal movement, and is guided by slotted standards 48, secured to a bar, 49, supported upon arms 50, pivoted to the bracket 39, projections 51 from each end of the table 44 fitting into the slots of said standards.

The standards 48 are connected at their top by a slotted bar, 52, to which a recessed cap, 53, is adjustably secured, said standards and bar being partially supported by arms 54, pivoted to the bracket 39.

Secured to the bar 52 is an open frame, 55, to which a spring, 56, with clasp 57, is adjustably connected, the latter serving to hold one end of the binding tape or band to the cap 53, forming an adjustable clamp for the same, which allows the binding tape or band to slip as the table 44 is lowered for each fresh signature.

To the under side of the table 44 is adjustably secured a clamp, 58, between which and a spring, 59, the other end of the binding tape or band is held.

As many clamps, consisting of the spring-clasp 56 57, cap 53, and clamps 58, are provided as there are head-blocks 1, unless the tape or band is very wide, when one will do, their function being to hold the binding tape or band neatly in front of the clinching devices, and between them and the back of the signatures.

The bar 49 is controlled by a cam, 60, (see Fig. 4,) which runs loosely upon the shaft 40, to which the bracket 39 is journaled.

A friction-clamp, 61, secured to the bracket 39, and pressing upon the periphery of the cam 60, causes it to move with the bracket 39, if desired.

On the cam 60 is a zigzag groove, 62, in which a roller on the end of the bar 49 fits.

This cam is also provided with ratchet-teeth 63 upon its periphery, into which a pawl, 64, pivoted to the frame of the machine, is made to engage, for the purpose and in the manner hereinafter described.

The degree of pressure of the spring 47 materially affects the compactness of the stapling, and as different kinds of paper require more or less swell in the back of the book, the pressure of the spring, must be varied to correspond thereto.

Instead of a spring, a lever with removable or adjustable weights may be employed.

Clinching: 64 are clincher-stocks, secured adjustably, by clamps 65 and set-screws 66, to the bracket 39, corresponding in number and position to the head-blocks 1.

They are shown more clearly in detail views, Fig. 5.

Each is provided with devices for first bending toward each other the protruding legs of the staple, and then pressing them flat against the material through which the staples have been inserted.

The clincher-stock is formed in front by a plate, provided with a slot, 67, countersunk at its ends, which plate acts as a support for the binding tapes or bands and signatures against the thrust of the staple, the legs of which, coming directly opposite the countersinks, are guided by them with certainty into the slot.

68 are clincher-plates, of bell-crank form, pivoted at 69 to a slide, 70.

A stud, 71, is fixed to the clincher-stock, around which the clincher-plates turn as a common center; yet these plates are not attached to this stud, but are only held against it during their partial rotation, until a shoulder, 72, upon the slide comes in contact with them, when they move together.

This shoulder 72 is not essential, as, when the clincher-plates come together and the slide moves forward, they would move with it.

In moving the slide 70 forward the clincher-plates 68 are first swung around the stud 71 until their forward ends meet, which serve to bend the legs of the staple around toward each other, and nearly flat against the material being stapled.

The continued forward motion of the slide 70 forces the clincher-plates forward bodily through the slot 67, and hard against the bent staple-legs, which operate to close them down firmly and flat against the binding tape or bands, or other material through which the staple has been inserted.

A slight groove, 73, is made in the outer ends of the clincher-plates 68, to prevent the legs of the staple from slipping off to one side while under pressure.

The slide 70 is provided with a tenon, 74, which fits in a mortise, 75, in a bar, 76, working in bearings on the bracket 39.

This bar is operated by two levers, 77, bifurcated at their outer ends at 78, operated by the cams 79, which levers, when the bracket 39 has been vibrated to present the signature to the head-blocks, engage with the ends of the bar 76, when the staple has been inserted, these cams then moving it forward to operate the clinching-plates 68, and, after the clinching has been completed, move the clinching-plates 68 back, and then release the bar 76, the bracket 39 again assuming a position ready to receive another signature.

As many clincher-stocks may be arranged side by side, and their clincher-plates all be operated by the same bar 76, as there are head-blocks 1, which can be adjusted to and from each other.

If the table 44 remained stationary during the stapling operations the staples would all be inserted in a line, as shown in Fig. 8 at 80, and thus render that portion of the book bulky.

To obviate this it becomes necessary sometimes to set the staples in several rows in the same tape or band, as shown in Fig. 8 at 81.

To accomplish this the table 44 and tapes are shifted sidewise between the stapling of each signature in the following manner, the tapes or bands being made wide enough to permit this:

The pawl 64 is thrown into contact with the ratchet-teeth 63 of the cam 60.

As the bracket 39 is vibrated into position to permit the staple to be inserted, and as the cam 60 cannot move, being held by the pawl 64, the friction-clamp 61 slides over the periphery of the cam 60, and the bar 49 is moved by the zigzag groove 62, and with it the standards 48 and table 44.

As the bracket 39 is vibrated back into position to receive another signature the cam 60 is caused to move with it, through means of the friction-clamp 61, until the pawl 64 again engages with the ratchet-teeth 63 on cam 60, and the groove 62 in the cam having changed its direction, upon the next movement of the bracket 39 the table is forced back again into its original position.

Thus, upon the addition of each new signature, the table is shifted sidewise.

By increasing this sidewise motion one head-block, 1, and one clincher-stock could be employed to insert several staples automatically through one signature; but we prefer to duplicate the head-blocks and clincher-stocks, that method being most economical in the results obtained.

In machines constructed as above described the staples are driven through the signature and binding tapes or bands without any previous perforations for their legs, the latter making their own holes.

If at any time it should be found desirable, by reason of the hardness of the material to be stapled, or for any other cause, that holes be made for the reception of the legs of the staple, we provide the plates 25 with short points 82, which also have the channels 26 on their inner sides, as shown in Fig. 6.

Then, by altering the faces of the cams 20, so that just before the clinchers operate to bend down the legs of the staple they are slightly withdrawn, the staple-driver 28, resting upon the crown of the staple, pushes the signature partially off of said points, sufficiently out of the way to protect them from injury by the clinchers.

Mode of operation: The table 44 is placed in its highest position, and that portion of the bracket 39 carrying the table 44 and clincher-stocks 64 is vibrated to its lowest position.

A signature is then laid upon the table 44, partially opened, in which position it is held by the hand of the operator.

As the main shaft 19 revolves, the cams 20 raise the bracket 39, the cams 24 vibrate the swinging mandrel 21, causing its bifurcations to pass through the slots in plate 7, and in front of the wire previously fed. The cams 17 then cause the bending-fork 8 and its prongs 9 10 to advance to sever the wire, and bend it from its ends toward the center, around the bifurcations of the mandrel 21, until the ends of the prongs 9 10 of said fork come in proximity to the ends of the plates 25, when the cams 24 cause the mandrel 21 to be vibrated, and its bifurcations to be removed from the recess in the head-block 1, out of the path of the staple-driver 28, which is then caused to advance by cams 32 forcing the staple which has just been formed from the channels in the inner faces of the prongs 9 10 of the bending-fork 8 into the channels 26 in the plates 25.

While this operation is going on the bracket 39 has been raised so that the front of the head-block lies snugly in the fold of the signature, pressing the latter and the binding tapes or bands against the front plate of the clincher-stock, having the slot 67.

The staple-driver 28 has at this moment forced the staple, guided by the channels 26 of the plates 25, into and through the signature and binding tape or band, forcing its crown snugly against the fold of the signature, and its legs guided by the countersinks into the slot 67.

The driver 28 in this position rests stationary, while the cams 79, through the levers 77 and bar 76, force forward the slide 70, which causes the clinching-plates 68 to partially revolve around the stud 71 until they meet, thus bending the legs of the staple toward each other, at which time the slide 70, with the said plates, still advancing, forces the bent ends of the staple-legs out of the slot 67, and snugly against the binding tape or band and signature.

The cams 32 and connections then cause the driver 28 to be retracted; the cams 17 and their connections then cause the bending-fork 8 and prongs 9 10 to be retracted; the cams 20 and connections then cause the bracket 39 to be lowered; the operator allows the signature to be closed, when the machine is ready to receive another signature, which is operated upon as before.

As the bracket 39 is raised for the next operation the operator, holding the new signature open, as before, the lower half coming in contact with the under surface of the head-block 1 and support 4, causes the table 44 to yield just the thickness of a signature, the pawls 46 and ratchet 45 preventing it from rising.

When it is found desirable to place the staples in the signatures and binding tapes or bands in alternate rows, as shown at 81, Fig. 8, the pawl 64 is thrown into operation with the ratchet-teeth 63, and the table 44 is caused to moved sidewise, backward, and forward in the manner before described.

We do not confine ourselves to the exact construction or arrangement of the devices described, as many others might be adopted that would perform the same function without departing from our invention.

What we claim as new, and desire to secure by Letters Patent, is—

1. Staple presenting and inserting devices, constructed substantially as specified, so as to enter the fold of a partially-opened signature, and present the staple within the same for insertion through the fold.

2. The combination of staple presenting and inserting devices, constructed so as to enter the fold of a partially-opened signature, and present the staple within the same for insertion through the fold, with a work-supporting table, which places the signature in position for the presentation and insertion of the staple, all substantially as specified.

3. The combination of staple presenting and inserting devices, constructed so as to enter the fold of a partially-opened signature, and present the staple within the same for insertion through the fold, with a work-supporting table, which places the signature in position for the presentation and insertion of the staple and clinching devices, all substantially as specified.

4. A support for staple-inserting devices, cut away so as to present the staple within the fold of a partially-opened signature, for insertion through the same, substantially as described.

5. In combination with a bending-fork, grooved plates to receive the staple from the prongs of the fork, and guide and support it while being driven, all substantially as described.

6. In combination with a bending-fork to form the staple, grooved plates to receive the staple from said fork, and guide and support it while being driven, and a staple-driver, all substantially as described.

7. The grooved plates for receiving the staple, and guiding and supporting it while being driven, provided with points to puncture the material, substantially as shown and described.

8. The combination of the staple-driver with the grooved plates, provided with points to puncture the material for the reception of the staple, substantially as described.

9. The clinchers having two motions, first rotating on a common center to bend the staple-legs toward each other, and then moving forward in a straight line to press the bent staple-legs close down upon the material through which they protrude, substantially as specified.

10. The combination of the clincher-plates with the slide that operates them, substantially as specified.

11. The combination of the clincher-plates 68, stud 71, and slide 70, to which said clincher-plates are pivoted, substantially as specified.

12. The combination of the bar 76 with the levers 77, arranged to engage only during the time the clincher-plates are to operate, and at all other times to be detached, substantially as specified.

13. The combination of two slides, 70, with the bar 76, by which they are simultaneously operated, substantially as specified.

14. The combination of two or more independent longitudinally-adjustable staple-inserting devices with an equal number of independent longitudinally-adjustable staple-clinching devices, operating to insert and clinch two or more staples simultaneously, substantially as specified.

15. The combination of staple inserting and clinching devices with a work-supporting table, constructed so as to retain the stapled signature thereon while the next signature is being stapled, all substantially as specified.

16. The combination of staple inserting and clinching devices with a table, 44, and devices to prevent the premature ascent of the table when the downward pressure upon it is removed, substantially as specified.

17. The combination of staple-inserting devices with clamps to hold the tapes or bands at the back of the signature, one clamp being arranged above and another below the line of insertion of the staples, substantially as specified.

18. The combination of the shifting-bar 49 and standards 48 with a swinging bracket, 39, substantially as specified.

19. The combination of a shifting-bar, 49, standards 48, table 44, and clamps 53 57 58 with the staple inserting and clinching devices, whereby the book and tapes are shifted sidewise, causing two or more rows of staples to be inserted into each tape, substantially as specified.

20. In combination with the shifting-bar 49 and standards 48, the cam 60, to automatically shift the bar and standards between each stapling operation, substantially as specified.

21. The combination of the cam 60 with the pawl 64 and clamp 61, constructed and operating substantially as specified.

22. The head-blocks 1, provided with two wire-channels, as and for the purpose specified.

23. The combination, with a staple-driver, 28, of a spring, 34, and a slide, 30, having elongated bearings, substantially as specified.

24. The combination of bar 29 with one or more drivers, 28, slides 30, and springs 34, substantially as specified.

25. The combination of bar 14 with one or more bending-forks, 8, substantially as specified.

26. The mandrel 21, bifurcated, combined with the plate 7, through slots in which the bifurcations extend, substantially as specified.

27. The combination of the shaft 22 with one or more mandrels, 21, substantially as specified.

In testimony whereof we have signed our names to this specification in the presence of two subscribing witnesses.

HENRY R. HEYL.
HUGO BREHMER.

Witnesses:
WM. C. STEVENSON,
C. S. PATTERSON.